Jan. 11, 1949.  A. COX  2,458,836
OPTICAL OBJECTIVE OF THE TELEPHOTO TYPE HAVING
AXIALLY SEPARATED CONVERGENT FRONT AND
DIVERGENT REAR MEMBERS
Filed May 31, 1946
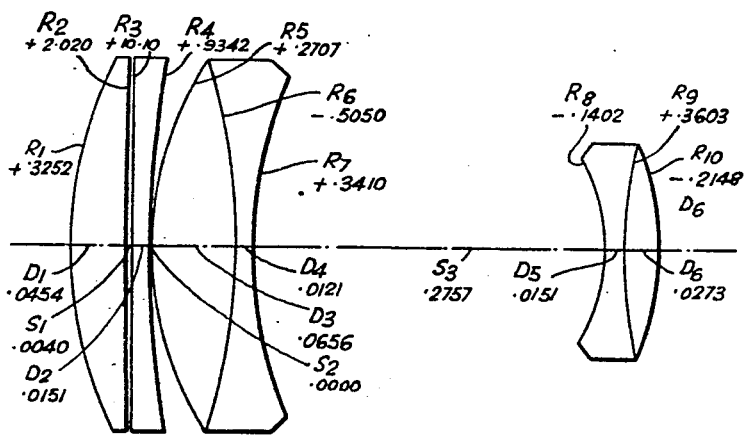
Inventor
ARTHUR COX
By
Emery Holcomb & Blair
Attorney Patented Jan. 11, 1949

2,458,836

UNITED STATES PATENT OFFICE 2,458,836

OPTICAL OBJECTIVE OF THE TELEPHOTO TYPE HAVING AXIALLY SEPARATED CONVERGENT FRONT AND DIVERGENT REAR MEMBERS

Arthur Cox, Leicester, England, assignor to Taylor, Taylor & Hobson Limited, Leicester, England, a company of Great Britain Application May 31, 1946, Serial No. 673,303
In Great Britain April 3, 1946

10 Claims. (Cl. 88—57)

1

This invention relates to optical objectives of the telephoto type, corrected for spherical and chromatic aberrations, coma, astigmatism and field curvature and comprising a convergent front member axially separated from a divergent rear member by an air space between .20 and .35 times the equivalent focal length of the objective, the convergent front member consisting of two meniscus doublets, having their outer surfaces convex to the front, whilst the divergent rear member consists of a single meniscus doublet with its outer surfaces concave to the front. It should be made clear that the terms "front" and "rear" are herein employed, in accordance with usual convention, to relate to the sides of the objective respectively nearer to and further from the longer conjugate.

The present invention has for its object to provide an improved telephoto objective of this type having a higher degree of correction for the various aberrations, and especially an improved correction both for spherical aberration on the axis and for oblique spherical aberration in the portion of the field away from the axis.

In the telephoto objective according to the invention the internal contact surface in the divergent rear member is collective and convex to the front, and the two doublets of the convergent front member are separated from one another by an axial air space not greater than .01 times the equivalent focal length of the objective (a zero separation not being excluded), the internal contact surface in the front doublet of the front member being dispersive and either convex or concave to the front, whilst that in the rear doublet of the front member is collective and concave to the front. The radius of curvature of the internal contact surface in the rear doublet of the front member preferably lies between .25 and 1.0 times the equivalent focal length of the objective.

The term "internal contact surface" is employed herein, whether or not the two cooperating surfaces of the elements have exactly the same radius of curvature and whether or not

2 they are cemented together. In the case of a broken contact, the power of the "internal contact surface" may be taken as the algebraic sum of the powers of the two cooperating surfaces of the contact, and the radius of curvature of the "internal contact surface" may be taken as the harmonic mean between the radii of curvature of the two cooperating surfaces.

The front doublet of the front member preferably consists of a convergent element in front of a divergent element, with the radius of curvature of its internal contact surface numerically greater than the equivalent focal length of the objective. Such internal contact surface is preferably in the form of a broken contact, with its two cooperating surfaces both convex to the front, the radius of curvature of the rear surface of the convergent front element lying between 1.0 and 4.0 times the equivalent focal length of the objective, whilst that of the front surface of the divergent element lies between 5.0 and 20.0 times such equivalent focal length.

The internal contact surface in the rear doublet of the front member is preferably cemented, the mean refractive indices of the materials of the two elements not differing from one another by more than .025.

The internal contact surface in the divergent rear member is also preferably cemented with radius of curvature lying between .25 and .5 times the equivalent focal length of the objective. The mean refractive index of the material of the rear element of such member preferably exceeds that of the front element thereof by not less than .025 and not more than .065.

A convenient practical example of telephoto objective according to the invention is illustrated in the single figure of the accompanying drawing, and numerical data for this example are given in the following table in which $R_1$, $R_2$ . . . represent the radii of curvature of the individual surfaces, the positive sign indicating that the surface is convex to the front and the negative sign that it is concave thereto, $D_1$, $D_2$ . . . represent the axial thicknesses of the various elements, and $S_1$, $S_2$, $S_3$ represent the axial air separations between the elements.

The table also gives the mean refractive indices for the D-line and the Abbé V numbers of the materials used.

| Equivalent focal length 1.000 | | Relative Aperture F/3.5 | |
| --- | --- | --- | --- |
| Radius | Thickness or Air Separation | Refractive Index $n_D$ | Abbé V Number |
| $R_1 +$ .3252 | $D_1$ .0454 | 1.530 | 51.9 |
| $R_2 +$ 2.20 | $S_1$ .0040 | | |
| $R_3 +$ 10.10 | $D_2$ .0151 | 1.699 | 30.5 |
| $R_4 +$ .9342 | $S_2$ .0000 | | |
| $R_5 +$ .2707 | $D_3$ .0656 | 1.613 | 57.6 |
| $R_6 -$ .5050 | $D_4$ .0121 | 1.605 | 38.2 |
| $R_7 +$ .3410 | $S_3$ .2757 | | |
| $R_8 -$ .1402 | $D_5$ .0151 | 1.613 | 59.3 |
| $R_9 +$ .3603 | $D_6$ .0273 | 1.653 | 46.2 |
| $R_{10} -$ .2148 | | | |

It will be noticed that in this example the front doublet of the front member has a broken contact convex to the front, such contact being dispersive with radius of curvature about 3.37 times the equivalent focal length of the objective, whilst the internal contact surfaces in the other two doublets are both cemented and collective. The back focal length is .397 times the equivalent focal length of the objective and the overall axial distance between the front surface of the objective and the rear focal plane is .857 times such equivalent focal length.

What I claim as my invention and declare to secure by Letters Patent is:

1. A telephoto objective, corrected for spherical and chromatic aberrations, coma, astigmatism and field curvature, and comprising a convergent front member and a divergent rear member axially separated from one another by an air space between .20 and .35 times the equivalent focal length of the objective, the divergent rear member being in the form of a meniscus doublet with its outer surfaces concave to the front and with its internal contact surface collective and convex to the front, whilst the convergent front member consists of two meniscus doublets separated from one another by an air space whose axial length lies between zero and .01 times the equivalent focal length of the objective and having their outer surfaces convex to the front, the front doublet having a convergent element in front of a divergent element, the internal contact surface between these elements being dispersive and having a radius of curvature greater than the equivalent focal length of the objective, whilst the internal contact surface in the rear doublet of the front member is collective and concave to the front with radius of curvature between .25 and 1.0 times such equivalent focal length.

2. A telephoto objective as claimed in claim 1, in which the internal contact surface in the rear doublet of the front member is cemented, the mean refractive indices of the materials of the two elements of the doublet not differing from one another by more than .025.

3. A telephoto objective as claimed in claim 1, in which the internal contact surface in the divergent rear member is cemented and has radius of curvature lying between .25 and .5 times the equivalent focal length of the objective.

4. A telephoto objective, corrected for spherical and chromatic aberrations, coma, astigmatism and field curvature, and comprising a convergent front member and a divergent rear member axially separated from one another by an air space between .20 and .35 times the equivalent focal length of the objective, the divergent rear member being in the form of a meniscus doublet with its outer surfaces concave to the front and with its internal contact surface collective and convex to the front, and having radius of curvature between .25 and .5 times the said equivalent focal length, whilst the convergent front member consists of two meniscus doublets separated from one another by an air space whose axial length lies between zero and .01 times the equivalent focal length of the objective and having their outer surfaces convex to the front, the internal contact surface in the front doublet being dispersive, whilst that in the rear doublet of the front member is collective and concave to the front with radius of curvature between .25 and 1.0 times the said equivalent focal length.

5. A telephoto objective, corrected for spherical and chromatic aberrations, coma, astigmatism and field curvature, and comprising a convergent front member and a divergent rear member axially separated from one another by an air space between .20 and .35 times the equivalent focal length of the objective, the divergent rear member being in the form of a meniscus doublet with its outer surfaces concave to the front and with its internal contact surface collective and convex to the front, whilst the convergent front member consists of two meniscus doublets separated from one another by an air space whose axial length lies between zero and .01 times the equivalent focal length of the objective and having their outer surfaces convex to the front, the internal contact surface in the front doublet being dispersive, whilst that in the rear doublet of the front member is cemented and collective and concave to the front with radius of curvature between .25 and 1.0 times the said equivalent focal length and the mean refractive indices of the materials of such rear doublet do not differ from one another by more than .025.

6. A telephoto objective as claimed in claim 5, in which the internal contact surface in the divergent rear member is cemented and has radius of curvature lying between .25 and .5 times the equivalent focal length of the objective.

7. A telephoto objective, corrected for spherical and chromatic aberrations, coma, astigmatism and field curvature, and comprising a convergent front member and a divergent rear member axially separated from one another by an air space between .20 and .35 times the equivalent focal length of the objective, the divergent rear member being in the form of a meniscus doublet with its outer surfaces concave to the front and with its internal contact surface collective and convex to the front, whilst the convergent front member consists of two meniscus doublets separated from one another by an air space whose axial length lies between zero and .01 times the equivalent focal length of the objective and having their outer surfaces convex to the front, the internal contact surface in the rear doublet of the front member being collective and concave to the front with radius of curvature between .25 and 1.0 times such equivalent focal length, whilst the internal contact surface in the front doublet is in the form of a broken contact with its two cooperating surfaces both convex to the front, the radius of curvature of the rear surface of the front element lying between 1.0 and 4.0 times the said equivalent focal length and that of the front surface of the rear element between 5.0 and 20.0 times such equivalent focal length.

8. A telephoto objective as claimed in claim 7, in which the internal contact surface in the rear doublet of the front member is cemented, the mean refractive indices of the materials of the two elements of the doublet not differing from one another by more than .025.

9. A telephoto objective as claimed in claim 7, in which the internal contact surface in the divergent rear member is cemented and has radius of curvature lying between .25 and .5 times the equivalent focal length of the objective.

10. A telephoto objective, corrected for spherical and chromatic aberrations, coma, astigmatism and field curvature, and comprising a convergent front member and a divergent rear member axially separated from one another by an air space between .20 and .35 times the equivalent focal length of the objective, the convergent front member consisting of two meniscus doublets separated from one another by an air space whose axial length lies between zero and .01 times the equivalent focal length of the objective and having their outer surfaces convex to the front, the internal contact surface in the front doublet being dispersive and that in the rear doublet being collective and concave to the front, whilst the divergent rear member is in the form of a meniscus doublet having its outer surfaces concave to the front and having its internal contact surface cemented and collective and convex to the front with radius of curvature between .25 and .5 times the equivalent focal length of the objective, the mean refractive index of the material of the rear element of such rear member exceeding that of the front element thereof by not less than .025 and not more than .065.

ARTHUR COX.

REFERENCES CITED

The following references are of record in the file of this patent:

UNITED STATES PATENTS

| Number | Name | Date |
| --- | --- | --- |
| 1,085,868 | Konig | Feb. 3, 1914 |
| 1,156,743 | Booth | Oct. 12, 1915 |
| 2,321,973 | Bennett | June 15, 1943 |
| 2,382,669 | Schade | Aug. 14, 1945 |